United States Patent
Blanchard et al.

(10) Patent No.: US 7,805,636 B2
(45) Date of Patent: *Sep. 28, 2010

(54) BOOTABLE POST CRASH ANALYSIS ENVIRONMENT

(75) Inventors: Anton Blanchard, Marrickville (AU); Milton Devon Miller, II, Austin, TX (US); Todd Alan Venton, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 444 days.

This patent is subject to a terminal disclaimer.

(21) Appl. No.: 11/968,274

(22) Filed: Jan. 2, 2008

(65) Prior Publication Data

US 2008/0104451 A1   May 1, 2008

Related U.S. Application Data

(63) Continuation of application No. 10/912,503, filed on Aug. 5, 2004, now Pat. No. 7,346,809.

(51) Int. Cl.
*G06F 11/00* (2006.01)
(52) U.S. Cl. .......................................... 714/37; 714/36
(58) Field of Classification Search .................. 714/36, 714/38, 37, 47; 717/124, 126, 128
See application file for complete search history.

(56) References Cited

U.S. PATENT DOCUMENTS

| 6,035,420 A | 3/2000 | Liu et al. |
|---|---|---|
| 6,493,837 B1 | 12/2002 | Pang et al. |
| 6,543,010 B1 | 4/2003 | Gaudet et al. |
| 6,728,907 B1 | 4/2004 | Wang et al. |
| 6,910,160 B2 | 6/2005 | Bajoria et al. |
| 7,346,809 B2 * | 3/2008 | Blanchard et al. ............. 714/37 |

OTHER PUBLICATIONS

China Patent office first office action for AUS920040593CN1(2005100771005) dated Jan. 12, 2007.
Observations and amendment to China Patent office dated May 28, 2007.
China Patent office second office action for AUS920040593CN1 (2005100771005) dated Aug. 24, 2007.
Observations and amendment to China Patent office action dated Nov. 8, 2007.

* cited by examiner

*Primary Examiner*—Dieu-Minh Le
(74) *Attorney, Agent, or Firm*—Yee & Associates, P.C.; Diana R. Gerhardt (57) ABSTRACT

A data processing system and computer program product for analyzing data from a crash of the data processing system. A portion of the memory in the data processing system is preserved in response to the crash of the data processing system. The data processing system is rebooted with an environment suited for analyzing trace data in the portion of the memory.

14 Claims, 4 Drawing Sheets

BOOTABLE POST CRASH ANALYSIS ENVIRONMENT

This application is a continuation of application Ser. No. 10/912,503, filed Aug. 5, 2004, now U.S. Pat. No. 7,346,809.

BACKGROUND OF THE INVENTION

1. Technical Field

The present invention relates generally to an improved data processing system, and in particular, to a method and apparatus for processing data. Still more particularly, the present invention relates to a method, apparatus, and computer instructions for analyzing data after a crash in a data processing system.

2. Description of Related Art

In testing applications and other components in a data processing system, a system crash is not uncommon during the testing and debugging phase. A system crash may occur when a fault or error is present from which the operating system cannot recover. Software or hardware may cause a system crash. A system crash means that the data processing system stops working and may be the result of a hardware malfunction or a serious software error or bug. A bug is an error or defect in software or hardware that causes the data processing system or software to malfunction.

After a system crash data is typically collected for analysis on a different system or on the current system after a reboot.

Analysis of the data after a system crash typically occurs on a different data processing system. Data from this crash is typically collected via an OS dump to tape or disk storage or an external service processor or through some other type of external analyzer. Collecting the data for remote analysis has a number of benefits. For example, the data processing system can in some cases be returned to operation while data analysis occurs in parallel. Also, the data from the crash can be collected in a production environment and transmitted to experts for analysis.

Limitations, however, also are present. One limitation to saving and restoring trace data is the size of the trace data. Trace data is data that is collected by hardware monitors or software monitors. These monitors record a sequence of events or data to form the trace data. For example, a monitor may record a trace of program flows or the monitor may record the sequence of data processed by the program or possibly data transmitted between components of the data processing system. The size of the trace data typically collected has to be limited due to the resources available, such as the capacity of a tape or disk or possibly the storage in the service element or its offload capabilities. In addition, the time to offload the trace data is proportional to the size of the trace and the bandwidth of the offload interface.

The service element is typically a relatively slow and low bandwidth support processor in comparison to the data processing system it maintains. In addition, the service processor must be relatively simple and self-initializing. This type of processor is sized to have the ability to initialize the data processing system and monitor it at runtime. As with all components in the data processing system, it is sized for only its primary initialization and monitoring tasks due to costs.

Typically, the service element has very limited bandwidth as well as processing and storage resources. This type of limitation becomes a major hurdle on some issues.

The service element is not the only method used to collect data. The operating system may transfer system dumps to disk or tape.

One example is in analyzing trace data collected in system memory. It is not uncommon to require trace data having a size of several gigabytes or greater. As a result, transferring this amount of trace data to a media, such as a hard disk or other storage device for analysis on another data processing system may be very time consuming, slowing down the testing and debug process. Often times, the trace data is moved to another data processing system because the operating environment on that data processing system is better suited for analyzing the trace data than the operating environment on which the trace data is collected.

Multiple ways are present for the service element to collect trace data. The service element can access memory and chip data via JTAG. This method works in a wide range of crashes, but is extremely slow. The second method is having the service processor DMA data from main system memory into its local memory. This approach is a much faster alternative, but requires a large amount of the system to be operational and of course the service element must have resources to store or offload the data.

Currently, the transferring and generic formatting of tens of megabytes of data takes hours. In some cases, filtering of data occurs during collection to reduce the amount of data that is collected. Alternatively, only portions of the trace data are collected sometimes for analysis. These solutions result in the loss of data that may be useful during analysis.

Therefore, it would be advantageous to have an improved method, apparatus, and computer instructions for analyzing data after a system crash.

SUMMARY OF THE INVENTION

The present invention provides a method, apparatus, and computer instructions for analyzing data from a crash of the data processing system. A portion of the memory in the data processing system is preserved in response to the crash of the data processing system. The data processing system is rebooted in the remaining memory with an environment suited for analyzing trace data in the preserved portion of the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
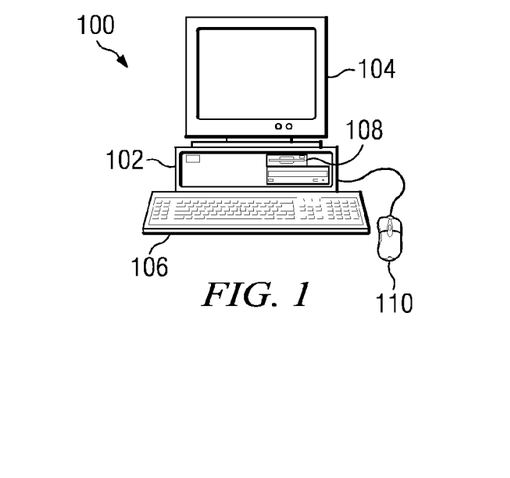
FIG. 1 is a pictorial representation of a data processing system in which the present invention may be implemented in accordance with a preferred embodiment of the present invention.

With reference now to the figures and in particular with reference to FIG. 1, a pictorial representation of a data processing system in which the present invention may be implemented is depicted in accordance with a preferred embodiment of the present invention. A computer 100 is depicted which includes system unit 102, video display terminal 104, keyboard 106, storage devices 108, which may include floppy drives and other types of permanent and removable storage media, and mouse 110. Additional input devices may be included with personal computer 100, such as, for example, a joystick, touchpad, touch screen, trackball, microphone, and the like. Computer 100 can be implemented using any suitable computer, such as an IBM eServer computer or IntelliStation computer, which are products of International Business Machines Corporation, located in Armonk, N.Y. Although the depicted representation shows a computer, other embodiments of the present invention may be implemented in other types of data processing systems, such as a network computer. Computer 100 also preferably includes a graphical user interface (GUI) that may be implemented by means of systems software residing in computer readable media in operation within computer 100.

Figure 2:
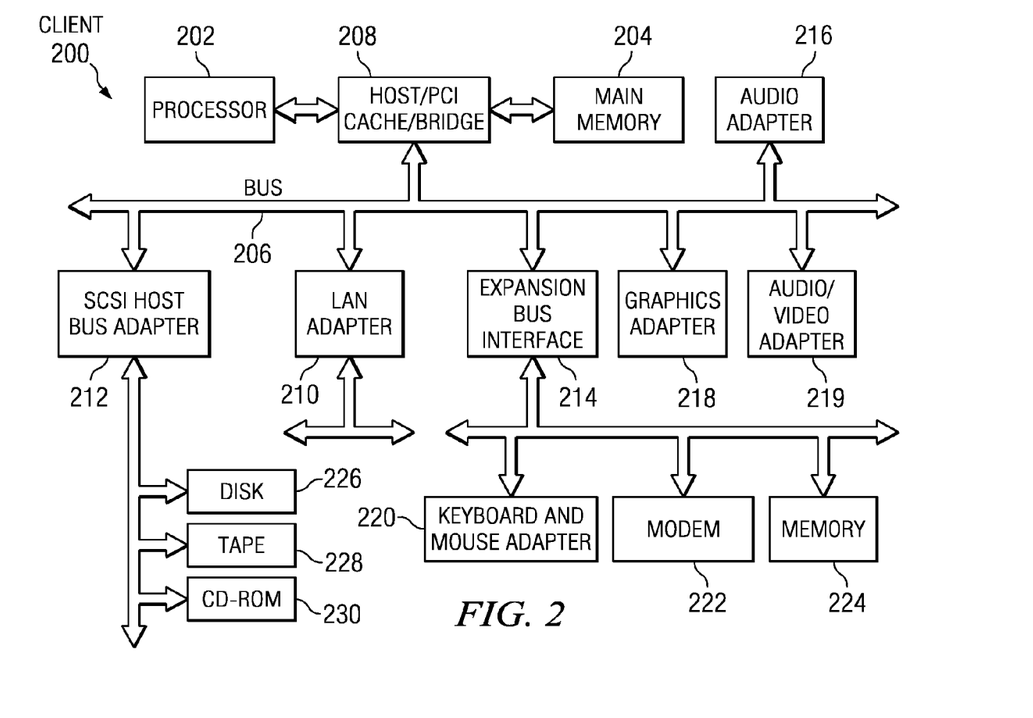
FIG. 2 is a block diagram of a data processing system in which the present invention may be implemented.

With reference now to FIG. 2, a block diagram of a data processing system is shown in which the present invention may be implemented. Data processing system 200 is an example of a computer, such as computer 100 in FIG. 1, in which code or instructions implementing the processes of the present invention may be located. Data processing system 200 employs a peripheral component interconnect (PCI) local bus architecture. Although the depicted example employs a PCI bus, other bus architectures such as Accelerated Graphics Port (AGP) and Industry Standard Architecture (ISA) may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in connectors. In the depicted example, local area network (LAN) adapter 210, small computer system interface (SCSI) host bus adapter 212, and expansion bus interface 214 are connected to PCI local bus 206 by direct component connection. In contrast, audio adapter 216, graphics adapter 218, and audio/video adapter 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM drive 230. Typical PCI local bus implementations will support three or four PCI expansion slots or add-in connectors.

An operating system runs on processor 202 and is used to coordinate and provide control of various components within data processing system 200 in FIG. 2. The operating system may be a commercially available operating system such as Windows XP, which is available from Microsoft Corporation. An object oriented programming system such as Java may run in conjunction with the operating system and provides calls to the operating system from Java programs or applications executing on data processing system 200. "Java" is a trademark of Sun Microsystems, Inc. Instructions for the operating system, the object-oriented programming system, and applications or programs are located on storage devices, such as hard disk drive 226, and may be loaded into main memory 204 for execution by processor 202.

Those of ordinary skill in the art will appreciate that the hardware in FIG. 2 may vary depending on the implementation. Other internal hardware or peripheral devices, such as flash read-only memory (ROM), equivalent nonvolatile memory, or optical disk drives and the like, may be used in addition to or in place of the hardware depicted in FIG. 2. Also, the processes of the present invention may be applied to a multiprocessor data processing system.

For example, data processing system 200, if optionally configured as a network computer, may not include SCSI host bus adapter 212, hard disk drive 226, tape drive 228, and CD-ROM 230. In that case, the computer, to be properly called a client computer, includes some type of network communication interface, such as LAN adapter 210, modem 222, or the like. As another example, data processing system 200 may be a stand-alone system configured to be bootable without relying on some type of network communication interface, whether or not data processing system 200 comprises some type of network communication interface. As a further example, data processing system 200 may be a personal digital assistant (PDA), which is configured with ROM and/or flash ROM to provide non-volatile memory for storing operating system files and/or user-generated data.

The depicted example in FIG. 2 and above-described examples are not meant to imply architectural limitations. For example, data processing system 200 also may be a notebook computer or hand held computer in addition to taking the form of a PDA. Data processing system 200 also may be a kiosk or a Web appliance. The processes of the present invention are performed by processor 202 using computer implemented instructions, which may be located in a memory such as, for example, main memory 204, memory 224, or in one or more peripheral devices 226-230.

Figure 3:
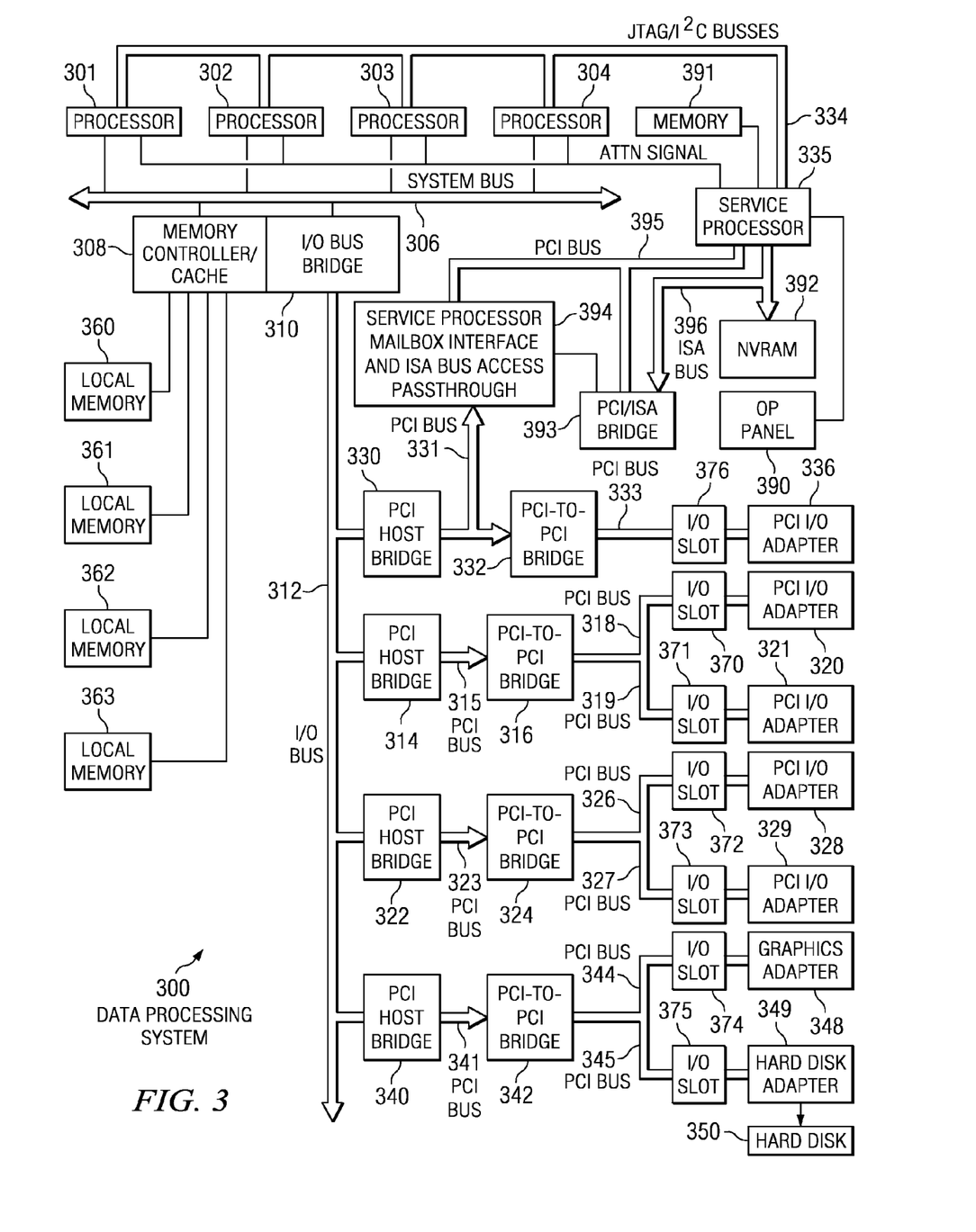
FIG. 3 is a block diagram of another data processing system in which the present invention may be implemented.

Next, FIG. 3 is a block diagram of another data processing system in which the present invention may be implemented is depicted. Data processing system 300 may be a symmetric multiprocessor (SMP) system including a plurality of processors 301, 302, 303, and 304 connected to system bus 306. For example, data processing system 300 may be an IBM eServer, a product of International Business Machines Corporation in Armonk, N.Y., implemented as a server within a network. Alternatively, a single processor system may be employed. Also connected to system bus 306 is memory controller/cache 308, which provides an interface to a plurality of local memories 360-363. I/O bus bridge 310 is connected to system bus 306 and provides an interface to I/O bus 312. Memory controller/cache 308 and I/O bus bridge 310 may be integrated as depicted.

Data processing system 300 is a logical partitioned (LPAR) data processing system in this example. Thus, data processing system 300 may have multiple heterogeneous operating systems (or multiple instances of a single operating system) running simultaneously. Each of these multiple operating systems may have any number of software programs executing within it. Data processing system 100 is logically partitioned such that different PCI I/O adapters 320-321, 328-329, and 336, graphics adapter 348, and hard disk adapter 349 may be assigned to different logical partitions. In this case, graphics adapter 348 provides a connection for a display device (not shown), while hard disk adapter 349 provides a connection to control hard disk 350.

Thus, for example, suppose data processing system 300 is divided into three logical partitions, P1, P2, and P3. Each of PCI I/O adapters 320-321, 328-329, and 336, graphics adapter 348, hard disk adapter 349, each of host processors 301-304, and memory from local memories 360-363 is assigned to each of the three partitions. In these examples, memories 360-363 may take the form of dual in-line memory modules (DIMMs). DIMMs are not normally assigned on a per DIMM basis to partitions. Instead, a partition will get a portion of the overall memory seen by the platform. For example, processor 301, some portion of memory from local memories 360-363, and I/O adapters 320, 328, and 329 may be assigned to logical partition P1; processors 302-303, some portion of memory from local memories 360-363, and PCI I/O adapters 321 and 336 may be assigned to partition P2; and processor 304, some portion of memory from local memories 360-363, graphics adapter 348 and hard disk adapter 349 may be assigned to logical partition P3.

Each operating system executing within data processing system 300 is assigned to a different logical partition. Thus, each operating system executing within data processing system 300 may access only those I/O units that are within its logical partition. Thus, for example, one instance of the Advanced Interactive Executive (AIX) operating system may be executing within partition P1, a second instance (image) of the AIX operating system may be executing within partition P2, and a Linux or OS/400 operating system may be operating within logical partition P3.

Peripheral component interconnect (PCI) host bridge 314 connected to I/O bus 312 provides an interface to PCI local bus 315. A number of PCI input/output adapters 320-321 may be connected to PCI bus 315 through PCI-to-PCI bridge 316, PCT bus 318, PCI bus 319, I/O slot 370, and I/O slot 371. PCI-to-PCI bridge 316 provides an interface to PCI bus 318 and PCI bus 119. PCT I/O adapters 320 and 321 are placed into I/O slots 370 and 371, respectively. Typical PCI bus implementations will support between four and eight I/O adapters (i.e. expansion slots for add-in connectors). Each PCI I/O adapter 320-321 provides an interface between data processing system 300 and input/output devices such as, for example, other network computers, which are clients to data processing system 300.

An additional PCI host bridge 322 provides an interface for an additional PCI bus 323. PCI bus 323 is connected to a plurality of PCI I/O adapters 328-329. PCI I/O adapters 328-329 may be connected to PCI bus 323 through PCI-to-PCI bridge 324, PCI bus 326, PCI bus 327, I/O slot 372, and I/O slot 373. PCI-to-PCI bridge 324 provides an interface to PCI bus 326 and PCI bus 327. PCI I/O adapters 328 and 329 are placed into I/O slots 372 and 373, respectively. In this manner, additional I/O devices, such as, for example, modems or network adapters may be supported through each of PCI I/O adapters 328-129. In this manner, data processing system 300 allows connections to multiple network computers.

A memory mapped graphics adapter 348 inserted into I/o slot 374 may be connected to I/O bus 312 through PCI bus 344, PCI-to-PCI bridge 342, PCI bus 341 and PCI host bridge 340. Hard disk adapter 349 may be placed into I/O slot 375, which is connected to PCI bus 345. In turn, this bus is connected to PCI-to-PCI bridge 342, which is connected to PCI host bridge 340 by PCI bus 341.

A PCI host bridge 330 provides an interface for a PCI bus 331 to connect to I/O bus 312. PCI I/O adapter 336 is connected to I/O slot 376, which is connected to PCI-to-PCI bridge 332 by PCI bus 333. PCI-to-PCI bridge 332 is connected to PCI bus 331. This PCI bus also connects PCI host bridge 330 to the service processor mailbox interface and ISA bus access pass-through logic 394 and PCI-to-PCT bridge 332. Service processor mailbox interface and ISA bus access pass-through logic 394 forwards PCI accesses destined to the PCI/ISA bridge 393. NVRAM storage 392 is connected to the ISA bus 396. Service processor 335 is coupled to service processor mailbox interface and ISA bus access pass-through logic 394 through its local PCI bus 395. Service processor 335 is also connected to processors 301-304 via a plurality of JTAG/I$^2$C busses 334. JTAG/I$^2$C busses 334 are a combination of JTAG/scan busses (see IEEE 1149.1) and Phillips I$^2$C busses. However, alternatively, JTAG/I$^2$C busses 334 may be replaced by only Phillips I$^2$C busses or only JTAG/scan busses. All SP-ATTN signals of the host processors 301, 302, 303, and 304 are connected together to an interrupt input signal of the service processor. The service processor 335 has its own local memory 391, and has access to the hardware OP-panel 390.

When data processing system 300 is initially powered up, service processor 335 uses the JTAG/I$^2$C busses 334 to interrogate the system (host) processors 301-304, memory controller/cache 308, and I/O bus bridge 310. At completion of this step, service processor 335 has an inventory and topology understanding of data processing system 300. Service processor 335 also executes Built-In-Self-Tests (BISTs), Basic Assurance Tests (BATs), and memory tests on all elements found by interrogating the host processors 301-304, memory controller/cache 308, and I/O bus bridge 310. Any error information for failures detected during the BISTs, BATs, and memory tests are gathered and reported by service processor 335.

If a meaningful/valid configuration of system resources is still possible after taking out the elements found to be faulty during the BISTs, BATs, and memory tests, then data processing system 300 is allowed to proceed to load executable code into local (host) memories 360-363. Service processor 335 then releases host processors 301-304 for execution of the code loaded into local memory 360-363. While host processors 301-304 are executing code from respective operating systems within data processing system 300, service processor 335 enters a mode of monitoring and reporting errors. The type of items monitored by service processor 335 include, for example, the cooling fan speed and operation, thermal sensors, power supply regulators, and recoverable and non-recoverable errors reported by processors 101-104, local memories 360-363, and I/O bus bridge 310.

Service processor 335 is responsible for saving and reporting error information related to all the monitored items in data processing system 300. Service processor 335 also takes action based on the type of errors and defined thresholds. For example, service processor 335 may take note of excessive recoverable errors on a processor's cache memory and decide that this is predictive of a hard failure. Based on this determination, service processor 335 may mark that resource for deconfiguration during the current running session and future Initial Program Loads (IPLs). IPLs are also sometimes referred to as a "boot" or "bootstrap".

Data processing system 300 may be implemented using various commercially available computer systems. For example, data processing system 300 may be implemented using IBM eServer iSeries Model 840 system available from International Business Machines Corporation. Such a system may support logical partitioning using an OS/400 operating system, which is also available from International Business Machines Corporation.

Those of ordinary skill in the art will appreciate that the hardware depicted in FIG. 3 may vary. For example, other peripheral devices, such as optical disk drives and the like, also may be used in addition to or in place of the hardware depicted. The depicted example is not meant to imply architectural limitations with respect to the present invention.

The present invention provides a method, apparatus, and computer instructions for a bootable post crash analysis environment. The mechanism of the present invention provides processing and bandwidth resources in the data processing system to perform the analysis. The same data processing system in which the crash occurred is used to perform this analysis.

The mechanism of the present invention preserves the trace data in the memory by using a memory preserving functionality in the data processing system to preserve those portions of the memory that are to be analyzed. The data processing system is then rebooted with an environment that is suited to analyze trace data using the remaining memory in the data processing system. In this manner, larger amounts of processing power and bandwidth resources are present. With this mechanism, interactive queries of trace data over 100 gigabytes has taken only a few minutes, rather than hours. This mechanism also eliminates the need to develop tight filtering of trace data during collection and/or preselection of portions of the trace data to submit for analysis.

Figure 4:
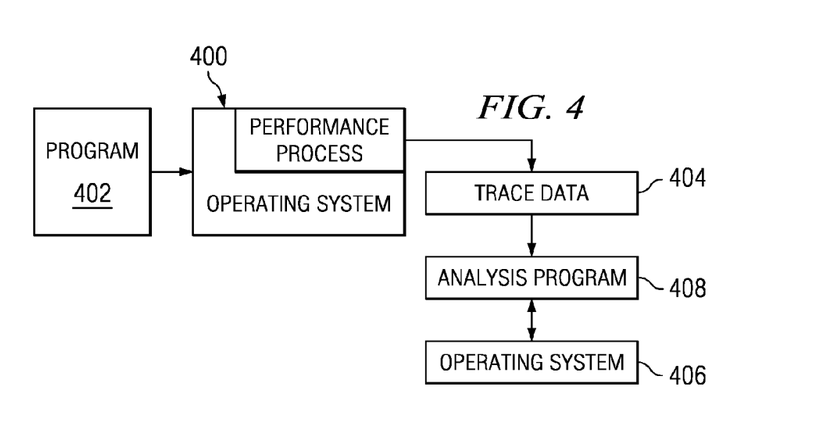
FIG. 4 is a diagram illustrating components used in analyzing trace data in accordance with a preferred embodiment of the present invention.

Turning next to FIG. 4, a diagram illustrating components used in analyzing trace data is depicted in accordance with a preferred embodiment of the present invention. Operating system 400 is used in the testing phase of program 402. Trace data 404 is collected and stored during the execution of program 402. If a crash of the data processing system occurs, trace data 404 is preserved in the memory when the data processing system is rebooted.

In these illustrative examples, the memory in which the trace data is located is placed into a self-timed refresh state. More specifically, the dynamic random access memory (DRAM) is placed into a state in which the DRAM is responsible to preserve its contents without explicit commands from the memory controller. The data processing system is rebooted with operating system 406 in place of operating system 400. Operating system 406 is used to provide an environment that is more suitable for analysis program 408 to analyze trace data.

Linux is an example of an operating system that may be used for analysis. Alternatively any application may be used assuming that the application suits the needs of the debug at hand. In addition, no requirement is present for a full operating system (OS) to be used. Any debug environment or specialized code may be used. The debug utilities may be designed to search and filter this memory with multiple processors being used to parallel search the different ranges of the trace data for selected patterns.

Figure 5:
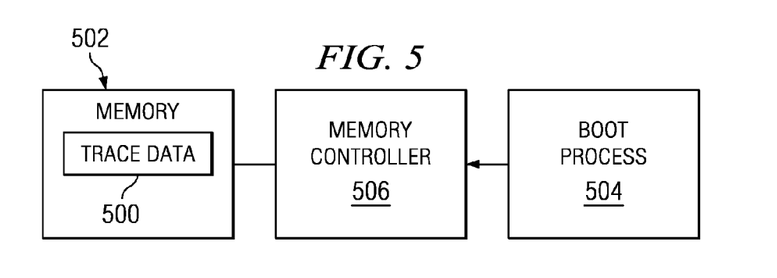
FIG. 5 is a diagram illustrating the retaining of trace data in accordance with a preferred embodiment of the present invention.

Turning now to FIG. 5, a diagram illustrating the retaining of trace data is depicted in accordance with a preferred embodiment of the present invention. In this example, trace data 500 is located within memory 502. If a crash occurs, the portion of memory 502 in which trace data 500 is located is placed into a self-timed refresh state to preserve this data. Memory 502 is placed into this state by boot process 504 in these examples. Alternatively, memory 502 may be placed into this state through a service controller. As a result, memory 502 retains trace data 500. This retention of data may be set through an interface, such as a Joint Test Action Group (JTAG) interface to memory controller 506.

Figure 6:
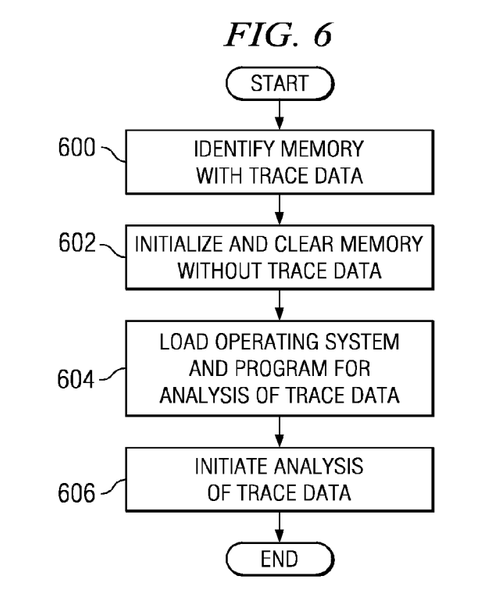
FIG. 6 is a flowchart of a process for providing a post crash analysis environment in accordance with a preferred embodiment of the present invention.

Turning now to FIG. 6, a flowchart of a process for providing a post crash analysis environment is depicted in accordance with a preferred embodiment of the present invention. The process illustrated in FIG. 6 may be implemented in a data processing system, such as data processing system 200 in FIG. 2. Specifically, this process may be placed into a boot process, such as boot process 504 in FIG. 5.

The process begins by identifying memory containing trace data (step 600). This identification may be made prior to the trace data being stored in the memory and storing the trace data in the identified location in memory. In this manner, the trace data generated by a performance program or process may be stored in the memory. Thereafter, memory without trace data is initialized and cleared (step 602). An operating system for analysis of the trace data is loaded (step 604). Analysis of the trace data is then initiated (step 606) with the process terminating thereafter.

Figure 7:
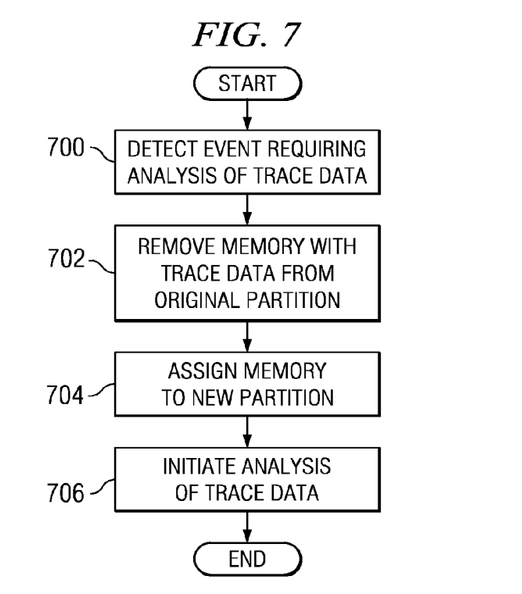
FIG. 7 is a flowchart of a process for providing an environment for analyzing trace data in accordance with a preferred embodiment of the present invention.

Turning next to FIG. 7, a flowchart of a process for providing an environment for analyzing trace data is depicted in accordance with a preferred embodiment of the present invention. The process illustrated in FIG. 7 may be implemented in a data processing system, such as data processing system 300 in FIG. 3. This data processing system may run a boot process, such as boot process 504 in FIG. 5.

The process begins by detecting an event requiring analysis of trace data (step 700). In response to detecting this event, the memory with the trace data is removed from the original partition in which the trace data is created (step 702). This memory is removed by removing the addresses containing the trace data from the list for the original partition. This memory is assigned to a new partition (step 704). The memory is assigned to the new partition by adding the range of addresses containing the trace data to that new partition. Thereafter, analysis of the trace data is initiated in the new partition (step 706) with the process terminating thereafter.

Figure 8:
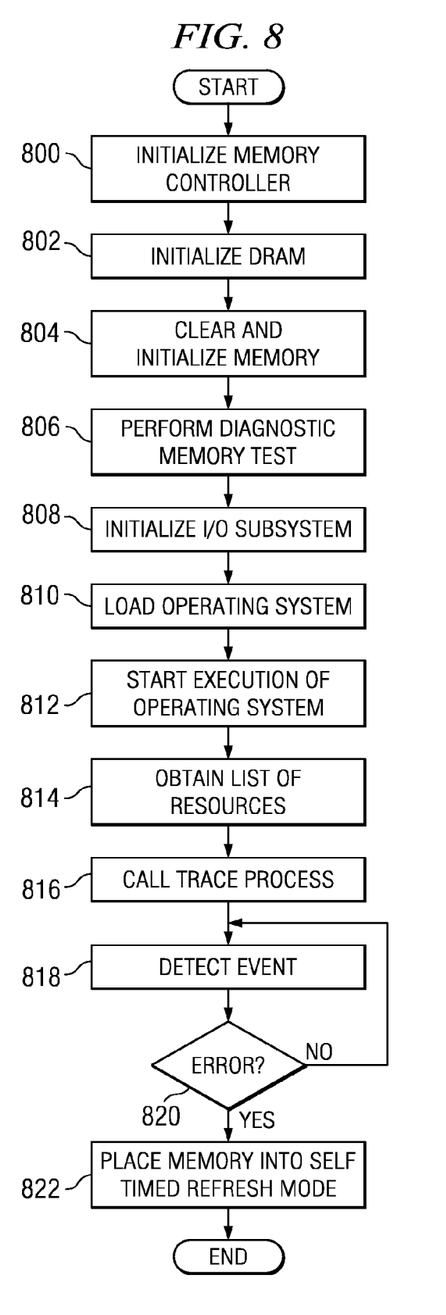
FIG. 8 is a flowchart of a process for setting memory to retain trace data in accordance with a preferred embodiment of the present invention.

Turning next to FIG. 8, a flowchart of a process for setting memory to retain trace data is depicted in accordance with a preferred embodiment of the present invention. The process illustrated in FIG. 8 may be implemented in various components, such as a service controller or in boot code. The steps implemented in boot code may be implemented in boot process 504 in FIG. 5.

The process begins by initializing the memory controller (step 800). The DRAM is then initialized (step 802). Initializing the DRAM to power up includes setting SDRAM mode registers and setting cache line sizes. Additionally, bank precharges also are issued and a memory refresh is initiated at a specific regular interval in this step of powering up the DRAM. The memory is then cleared and initialized (step 804). A diagnostic memory test is then performed (step 806). This step is an optional step in these examples. Steps 800 through 808 may be performed either by service controller or boot code. The service controller is, for example, a service processor that may be external to the data processing system.

Next, the I/O subsystem is initialized (step 808). The operating system is then loaded (step 810). The execution of the operating system is then stared (step 812). A list of resources is then obtained and initialized (step 814). This list of resources includes, for example, I/O resources and valid memory ranges. Additionally, the mechanism of the present invention includes a new list of resources, such as for example a designation of a memory bank that is to hold trace data during execution of a program. Thereafter, a sub-routine is called to designate a buffer in the memory identified in the list of resources to hold the trace data. Hooks are activated to store possibly relevant data in this buffer. These hooks may be activated through sub-routine calls (Step 816). Next, the process detects an event (step 818). A determination is made as to whether the event is an error of interest that requires rebooting the data processing system (step 820). This error may be a software or hardware detected error. If an error has not been detected, the process returns to step 818. Otherwise, the memory identified as containing the trace data is placed into a self timed refresh mode step 822 with the process terminating thereafter.

Steps 808 through 812 are performed by boot code. Steps 814 through 822 are performed by the operating system in these examples. This trace process is used to designate a buffer based on resources discovered as well as activate hooks, such as subroutine calls, to store possibly relevant data. This process is used to store data in the portion of memory that is to be preserved in the event of a system crash.

Figure 9:
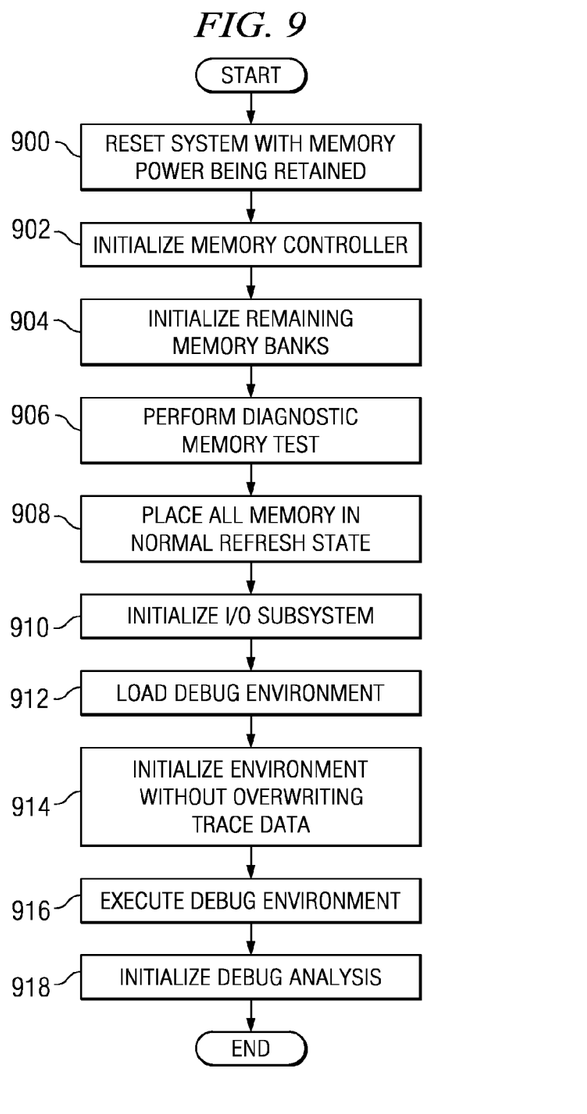
FIG. 9 is a flowchart of a process for saving trace data in accordance with a preferred embodiment of the present invention.

Turning now to FIG. 9, a flowchart of a process for rebooting a data processing system after a system crash is depicted in accordance with a preferred embodiment of the present invention. When a system reboots after an event of interest has occurred, such as a hardware or software detected error, the memory containing the trace data is placed into a refresh mode such as step 822 in FIG. 8. This is a self-timed refresh mode that causes the SDRAM to initiate refresh cycles as required to maintain its state rather than waiting for periodic refresh commands.

Thereafter, the system is reset with memory power being retained (step 900). The memory controller is then reinitialized with the designated bank already in refresh mode (step 902). The remaining memory banks are initialized normally (step 904). A diagnostic memory test is performed (step 906). This step is optional in these examples. All of the memory is then placed into a normal refresh state (step 908). The memory controller instructs the memory bank in the self-timed refresh mode to exit this mode and return to a normal refresh state. The I/O subsystem is initialized (step 910) and a debug environment is loaded (step 912). This debug environment in these examples is an alternate operating system.

Any debug code may be loaded to form the environment used to analyze the trace data. For example, a stand alone search program may be used to search the trace data for specific events and print its findings.

The environment is then initialized without overwriting the trace data (step 914). This step is performed by using the list of resources including the addresses in which the trace data is stored. The memory containing the trace data is treated as reserved. The other portions of the memory are overwritten and cleared. Execution of the debug environment then begins (step 916). The debug analysis is then initialized (step 918) with the process terminating thereafter.

Steps 900 through 906 may be performed either by service controller or boot code. Step 908 is performed by a memory controller through instructions by the boot code. Steps 910 through 916 are performed by the boot code while steps 914 and 918 may be initialized through the boot code or the operating system.

Depending on the implementation, rather than exposing the memory for the trace data in a list as in step 814 in FIG. 8, a memory controller may be connected to dedicated hardware designed to store system activity. With this type of implementation, the service controller initiates and stops the trace data collection hardware and instructs the memory controller to place the SDRAM into self-timed refresh. In this manner, the system may be rebooted and the memory controller with the trace data is mapped into the system address but not listed in the debug operating system as normal memory.

Thus, the present invention provides an improved method, apparatus, and computer instructions for a bootable post crash analysis environment. The mechanism of the present invention preserves trace data in the memory in the data processing system in which the crash occurs. The data processing system is then rebooted with a different environment, such as an operating system that is more suitable for analyzing trace data. The trace data is then analyzed using the system resources. In this manner, larger amounts of bandwidth and processing power are available for processing the trace data, reducing the amount of time needed to analyze this data.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system for analyzing data that is related to a crash of the data processing system, the data processing system comprising:

a memory and a memory controller;

while testing a program that is being executed by the data processing system and prior to the crash:

collecting means for collecting trace data; and storing means for storing the trace data in a portion of the memory, which is connected to the memory controller;

responsive to the crash occurring while testing the program, preserving means for preserving the trace data in the portion of the memory; and rebooting means for rebooting the data processing system with an environment suited for analyzing the trace data, the trace data remaining in the portion of the memory during the rebooting;

a boot process placing the portion of the memory into a self-timed refresh mode;

the portion of the memory maintaining, while in the self-timer refresh mode, the trace data without requiring a refresh command from the memory controller; and maintaining means for maintaining power to the portion of the memory.

2. The data processing system of claim 1 further comprising:
    analyzing means for analyzing the trace data using a remaining portion of the memory after the data processing system has been rebooted.

3. The data processing system of claim 1, further comprising:
    the memory controller communicating with a processor using a system bus to which the memory controller and the processor are connected.

4. The data processing system of claim 1, wherein the data processing system is a logical partitioned data processing system having a plurality of partitions and wherein the preserving means includes:
    removing means for removing the portion of the memory from a first partition in the plurality of partitions to form removed memory; and
    assigning means for assigning the removed memory to a second partition in the plurality of partitions, wherein the second partition contains an environment suited to analysis of trace data.

5. The data processing system of claim 1, wherein the rebooting means includes:
    loading means for loading a debug environment in the data processing system; and
    initializing means for initializing resources in the debug environment without overwriting the portion of the memory.

6. The data processing system of claim 5, wherein the initializing means avoids overwriting the portion of the memory using a list of resources in which the portion of the memory is treated as reserved.

7. The data processing system of claim 1, wherein the environment is an operating system.

8. A computer program product that is stored in a computer storage medium for analyzing data that is related to a crash of the data processing system, the computer program product comprising:
    while testing a program that is being executed by the data processing system:
        instructions for collecting trace data; and
        instructions for storing the trace data in a portion of a memory, which is connected to a memory controller;
    responsive to a crash of the data processing system occurring while testing the program, instructions for preserving the trace data in the portion of the memory; and
    instructions for rebooting the data processing system with an environment suited for analyzing the trace data, the trace data remaining in the portion of the memory during the rebooting;
    instructions for placing, by a boot process, the portion of the memory into a self-timer refresh mode;
    instructions for maintaining, by the portion of the memory while in the self-timer refresh mode, the trace data without requiring a refresh command from the memory controller; and
    instructions for maintaining power to the portion of the memory.

9. The computer program product of claim 8 further comprising:
    instructions for analyzing the trace data in the portion of the memory using a remaining portion of the memory.

10. The computer program product of claim 8, further comprising:
    the memory controller communicating with a processor using a system bus to which the memory controller and the processor are connected.

11. The computer program product of claim 8, wherein the data processing system is a logical partitioned data processing system having a plurality of partitions and wherein the instructions for preserving further include:
    instructions for removing a portion of the memory from a first partition in the plurality of partitions to form removed memory; and
    instructions for assigning the removed memory to a second partition in the plurality of partitions, wherein the second partition contains an environment suited to analysis of trace data.

12. The computer program product of claim 8, wherein the instructions for rebooting further include:
    instructions for loading a debug environment in the data processing system; and
    instructions for initializing resources in the debug environment without overwriting the portion of the memory.

13. The computer program product of claim 12, wherein the instructions for initializing avoid overwriting the portion of the memory using a list of resources in which the portion of the memory is treated as reserved.

14. The computer program product of claim 8, wherein the environment is an operating system.

* * * * *